United States Patent
Savage (10) Patent No.: US 10,415,320 B2
(45) Date of Patent: Sep. 17, 2019

(54) EARTH-BORING TOOLS INCLUDING REPLACEABLE HARDFACING PADS AND RELATED METHODS

(71) Applicant: Baker Hughes, a GE company, LLC, Houston, TX (US)

(72) Inventor: Michael T. Savage, Magnolia, TX (US)

(73) Assignee: Baker Hughes, a GE company, LLC, Houston, TX (US)

( * ) Notice: Subject to any disclaimer, the term of this patent is extended or adjusted under 35 U.S.C. 154(b) by 205 days.

(21) Appl. No.: 15/633,530

(22) Filed: Jun. 26, 2017

(65) Prior Publication Data
US 2018/0371843 A1    Dec. 27, 2018

(51) Int. Cl.
| | |
|---|---|
| *E21B 10/54* | (2006.01) |
| *B23K 1/00* | (2006.01) |
| *E21B 10/43* | (2006.01) |
| *B23K 101/00* | (2006.01) |

(52) U.S. Cl.
CPC ............ *E21B 10/54* (2013.01); *B23K 1/0008* (2013.01); *E21B 10/43* (2013.01); *B23K 2101/002* (2018.08)

(58) Field of Classification Search
CPC ...... E21B 10/62; E21B 17/12; E21B 17/1085; E21B 17/1092; E21B 10/54; E21B 2101/002
See application file for complete search history.

(56) References Cited

U.S. PATENT DOCUMENTS

| | | | | |
|---|---|---|---|---|
| 3,449,146 A | * | 6/1969 | Dawson | C23C 24/00 118/620 |
| 3,459,073 A | * | 8/1969 | Conover | E21B 10/58 76/108.1 |
| 3,982,596 A | | 9/1976 | Vetter | |
| 4,156,374 A | * | 5/1979 | Shwayder | B23P 6/00 175/325.2 |
| 4,545,441 A | | 10/1985 | Williamson | |
| 4,550,790 A | | 11/1985 | Link | |
| 5,904,213 A | * | 5/1999 | Caraway | E21B 10/003 175/393 |
| 6,260,636 B1 | * | 7/2001 | Cooley | E21B 10/00 175/408 |
| 6,651,756 B1 | * | 11/2003 | Costo, Jr. | E21B 10/55 175/374 |
| 7,625,521 B2 | * | 12/2009 | Izaguirre | B22F 7/06 419/10 |

(Continued)

*Primary Examiner* — Shane Bomar
(74) *Attorney, Agent, or Firm* — TraskBritt (57) ABSTRACT

Earth-boring tools may include a body having blades protruding therefrom and at least one hardfacing pad secured to at least one blade. The at least one hardfacing pad may be located at least partially within a recess extending at least into the at least one blade body around a circumference of a gage region of the body and may include a plate, an abrasion-resistant material secured to the plate on a side of the plate opposite the body, and at least one spacer extending from the plate toward the body, such that the plate is spaced from the body by at least a thickness of the at least one spacer. A braze material may secure the at least one hardfacing pad to the at least one blade, the braze material extending around the at least one spacer and located between the plate and the body.

20 Claims, 5 Drawing Sheets

(56) References Cited

U.S. PATENT DOCUMENTS

| | | | |
|---|---|---|---|
| 8,309,018 B2 * | 11/2012 | Smith | B22F 7/062 175/425 |
| 9,115,554 B2 | 8/2015 | Vempati et al. | |
| 9,145,739 B2 | 9/2015 | Hoffmaster et al. | |
| 2008/0283305 A1 * | 11/2008 | Overstreet | B23K 35/3033 175/425 |
| 2009/0032572 A1 * | 2/2009 | Oxfdord | B23K 1/0056 228/198 |
| 2011/0108326 A1 * | 5/2011 | Jones | E21B 10/43 175/57 |
| 2015/0345230 A1 | 12/2015 | Vempati et al. | |
| 2017/0216961 A1 * | 8/2017 | Utter | B23K 20/127 |
| 2018/0229467 A1 * | 8/2018 | Walker | E21B 10/62 |

\* cited by examiner

EARTH-BORING TOOLS INCLUDING REPLACEABLE HARDFACING PADS AND RELATED METHODS

FIELD

This disclosure relates generally to earth-boring tools and methods of making and repairing earth-boring tools. More specifically, disclosed embodiments relate to earth-boring tools and methods of making and repairing earth-boring tools that may increase tool and component reusability, facilitate production of tools of differing sizes and shapes using the same or similar base components, and more easily and efficiently enable the production and repair of such tools.

BACKGROUND

Earth-boring tools experience abrasive, erosive, and corrosive wear as they engage with an earth formation to form a borehole therein. Surfaces of such earth-boring tools may be coated in abrasion-resistant materials, such as, for example, hardfacing material or diamond-impregnated material, to resist such wear. Application of those materials may be accomplished, for example, by welding a coating onto a tool's surface, flame-spray coating, or forming the tool from those materials in the first place.

BRIEF SUMMARY

In some embodiments, earth-boring tools may include a body having blades protruding therefrom and at least one hardfacing pad secured to at least one blade. The at least one hardfacing pad may be located at least partially within a recess extending at least into the at least one blade around a circumference of a gage region of the body and may include a plate, an abrasion-resistant material secured to the plate on a side of the plate opposite the body, and at least one spacer extending from the plate toward the body, such that the plate is spaced from the body by at least a thickness of the at least one spacer. A braze material may secure the at least one hardfacing pad to the body, the braze material extending around the at least one spacer and located between the plate and the body.

In other embodiments, methods of making earth-boring tools may involve placing a braze material within a recess extending at least into a blade protruding from a body of the earth-boring tool around a circumference of a gage region of the body. At least one hardfacing pad may be placed at least partially within the recess, the at least one hardfacing pad comprising a plate, an abrasion-resistant material secured to the plate on a side of the plate opposite the body, and at least one spacer extending from the plate toward the body, such that a gap is located between the plate and the body. The at least one hardfacing pad may be temporarily secured in place by placing a retention member around the hardfacing pads. The body, the braze material, and the at least one hardfacing pad may be exposed to an elevated temperature, at least partially flowing the braze material. The braze material may solidify in response to cooling the braze material from the elevated temperature, the braze material securing the at least one hardfacing pad to the body of the earth-boring tool.

In still other embodiments, methods of repairing earth-boring tools may involve removing at least one hardfacing pad from within a recess extending at least into a blade protruding from a body of the earth-boring tool around a circumference of a gage region of the body. The at least one hardfacing pad may be replaced with at least another hardfacing pad located at least partially within the recess, the at least another hardfacing pad comprising a plate, an abrasion-resistant material secured to the plate on a side of the plate opposite the body, and at least one spacer extending from the plate toward the body, such that a gap is located between the plate and the body. The at least another hardfacing pad may be temporarily secured in place by placing a retention member in contact with the at least another hardfacing pad around the gage region. The body, a braze material located proximate the at least another hardfacing pad, and the at least another hardfacing pad may be exposed to an elevated temperature, at least partially flowing the braze material. The braze material may solidify in response to cooling the braze material from the elevated temperature, the braze material securing the at least another hardfacing pad to the body of the earth-boring tool.

BRIEF DESCRIPTION OF THE DRAWINGS

While this disclosure concludes with claims particularly pointing out and distinctly claiming specific embodiments, various features and advantages of embodiments within the scope of this disclosure may be more readily ascertained from the following description when read in conjunction with the accompanying drawings, in which:

DETAILED DESCRIPTION

The illustrations presented in this disclosure are not meant to be actual views of any particular earth-boring tool or component thereof, but are merely idealized representations employed to describe illustrative embodiments. Thus, the drawings are not necessarily to scale.

Disclosed embodiments relate generally to earth-boring tools and methods of making and repairing earth-boring tools that may increase tool and component reusability, facilitate production of tools of differing sizes and shapes using the same or similar base components, and more easily and efficiently enable the production and repair of such tools. More specifically, disclosed are embodiments of earth-boring tools that may include replaceable gage pads that may be secured to the bodies of the earth-boring tools in groups, reducing processing time, and subsequently be removed and replaced for easier reparability.

The term "earth-boring tool," as used herein, means and includes any type of bit or tool used for drilling during the formation or enlargement of a wellbore in a subterranean formation. For example, earth-boring tools include fixed-cutter bits, roller cone bits, impregnated bits, percussion bits, core bits, eccentric bits, bi-center bits, reamers, mills, hybrid bits including both fixed and rotatable cutting structures, and other drilling bits and tools known in the art.

As used herein, the term "tungsten carbide" means any material composition that contains chemical compounds of tungsten and carbon, such as, for example, WC, $W_2C$, and combinations of WC and $W_2C$. Tungsten carbide includes, for example, cast tungsten carbide, sintered tungsten carbide, and macrocrystalline tungsten carbide.

Figure 1:
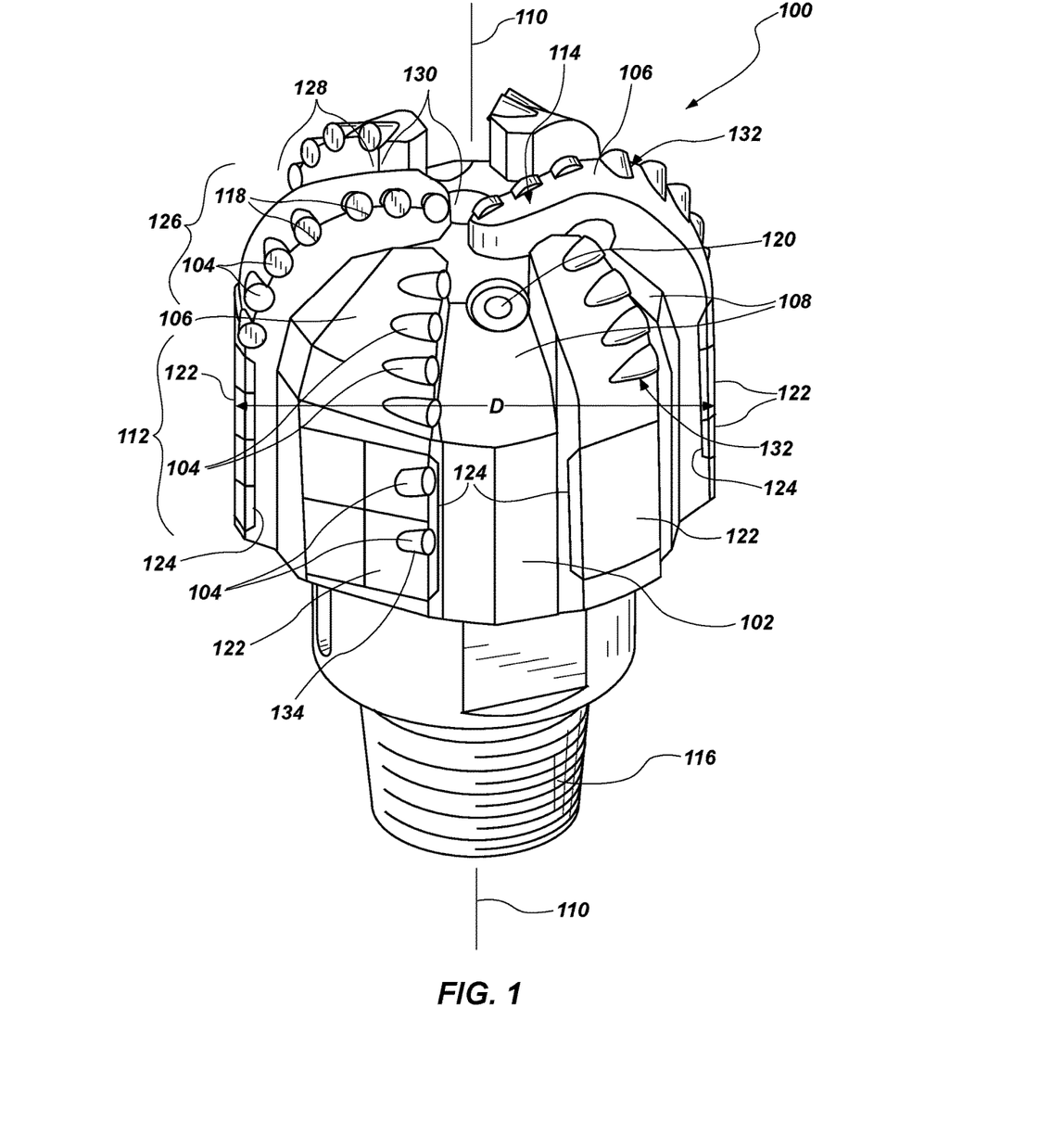
FIG. 1 is a perspective view of an earth-boring tool.

Referring to FIG. 1, a perspective view of an earth-boring tool 100 is shown. The earth-boring tool 100 shown in FIG. 1 may be configured as a fixed-cutter drill bit, but the techniques and components discussed in this disclosure may be applied equally to other earth-boring tools, such as, for example, those mentioned previously in connection with the term "earth-boring tool." The earth-boring tool 100 may include a body 102 having cutting elements 104 secured to the body 102. The body 102 may include, for example, a particle-matrix composite material or a metal or metal alloy material. More specifically, the body 102 may include a particle-matrix composite material including particles of a ceramic material supported within a matrix including a metal or metal alloy material. As specific, nonlimiting examples, the body 102 may include particles of tungsten carbide embedded within a cobalt-alloy matrix or may include a steel alloy material. The earth-boring tool 100 may include blades 106 extending outward from a remainder of the body 102, with junk slots 108 being located rotationally between adjacent blades 106. The blades 106 may extend radially from proximate an axis of rotation 110 of the earth-boring tool 100 to a gage region 112 at a periphery of the earth-boring tool 100. The blades 106 may extend longitudinally from a face 114 at a leading end of the earth-boring tool 100 to the gage region 112 at the periphery of the earth-boring tool 100. The earth-boring tool 100 may include a shank 116 at a trailing end of the earth-boring tool 100 longitudinally opposite the face 114. The shank 116 may have a threaded connection portion, which may conform to industry standards (e.g., those promulgated by the American Petroleum Institute (API)), for attaching the earth-boring tool 100 to a drill string.

The cutting elements 104 may be secured within pockets 118 formed in the blades 106. For example, the cutting elements 104 may be secured to the body 102 by a braze material 132 located between the cutting elements 104 and the body 102 at least within the pockets 118. Nozzles 120 located in the junk slots 108 may direct drilling fluid circulating through the drill string toward the cutting elements 104 to cool the cutting elements 104 and remove cuttings of earth material. The cutting elements 104 may be positioned to contact, and remove, an underlying earth formation in response to rotation of the earth-boring tool 100 when weight is applied to the earth-boring tool 100.

The earth-boring tool 100 may further include gage pads 122 secured to the blades 106 within the gage region 112. The gage pads 122 may be at least partially located within a recess 124 extending at least into the blades 106 around a circumference of the gage region 112 of the body 102. The recess 124 may extend radially from a radially outermost extent of the blades 106 toward the axis of rotation 110. The recess 124 may extend longitudinally from proximate the shank 116 toward the face 114 within at least the gage region 112, and the recess 124 may further extend longitudinally and radially from the gage region 112 into a shoulder region 126 located radially adjacent to, and closer to the axis of rotation 110 than, the gage region 112, into a nose region 128 located radially adjacent to, and closer to the axis of rotation 110 than, the shoulder region 126, and even into a cone region 130 located radially adjacent to the nose region 128 and radially surrounding the axis of rotation 110 in some embodiments.

As shown in FIG. 1, the gage pads 122 may be tiled within the recess 124, such that multiple gage pads 122 may be located within a given region of the recess 124. For example, the recess 124 may be located within at least the gage region 112 of the blades 106, and may not extend into the body 102 within the junk slots 108, and multiple gage pads 122 may be secured to each blade 106 within the gage region 112. In other embodiments, the gage pads 122 may be sized such that a single gage pad 122 is secured to each respective blade 106.

As also shown in FIG. 1, one or more of the gage pads 122 may include one or more cutting elements 104 secured to the respective gage pad 122. For example, the cutting elements 104 may be secured to the respective gage pad 122 by a braze material 132 located between the cutting elements 104 and the respective gage pad 122 at least within a pockets 134 extending into the gage pad 122. Other gage pads 122 may lack such cutting elements 104 and associated pockets 134. In some embodiments, each of the gage pads 122 on a given earth-boring tool may be free of cutting elements 104 and associated pockets 134. In other embodiments, each of the gage pads 122 on a given earth-boring tool may include one or more cutting elements 104 and associated pockets 134.

Figure 2:
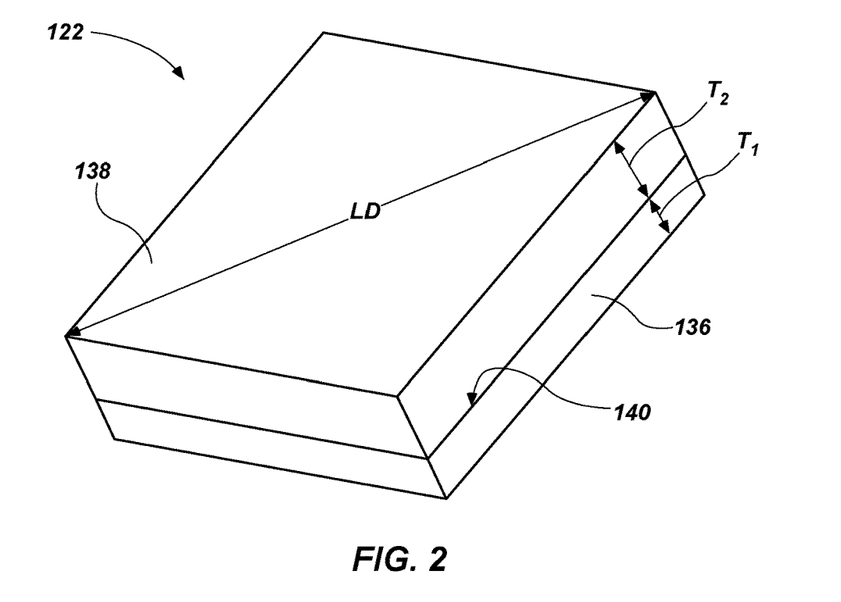
FIG. 2 is a perspective top view of a gage pad of the earth-boring tool of FIG. 1.

FIG. 2 is a perspective top view of a gage pad 122 of the earth-boring tool 100 of FIG. 1. The gage pad 122 may include a plate 136 and an abrasion-resistant material 138 located on the plate 136. The plate 136 may include, for example, a hard, wear-resistant material suitable for use in the downhole environment. More specifically, the plate 136 may include, for example, a particle-matrix composite material or a metal or metal alloy material. As a specific, nonlimiting example, the plate 136 may include a steel alloy material. The abrasion-resistant material 138 may include, for example, another hard, wear-resistant material different from the material of the plate 136 and also suitable for use in the downhole environment. More specifically, the abrasion-resistant material 138 may include, for example, a particle-matrix composite material or a metal or metal alloy, nitride or carbide material. As a specific, nonlimiting example, the abrasion-resistant material 138 may include a hardfacing material including hard particles (e.g., of diamond, boron nitride, tungsten carbide, aluminum nitride, etc.) in a matrix of metal or metal alloy material. The abrasion-resistant material 138 may be secured to the plate 136 by, for example, welding the abrasion-resistant material 138 to the plate 136 (e.g., by performing a hardfacing operation, using flame spray process, etc.).

A shape of a surface 140 of the plate 136 facing, and in contact with, the abrasion-resistant material 138 may be, for example, rectangular (e.g., square), triangular, pentagonal, hexagonal, or any other shape. More specifically, the surface 140 may be, for example, a geometric shape adapted to generate repeated, tiled patterns (e.g., mosaics). A greatest lateral dimension LD (i.e., a greatest distance between points on the periphery of the surface 140 as measured in a plane of the surface 140) of the surface 140 may be, for example, any size adapted to fill the expected space in a receiving recess 124 (see FIG. 1). For example, the greatest lateral dimension LD of the surface 140 may be between about 0.5 inch and about 8 inches. More specifically, the greatest lateral dimension LD of the surface 140 may be between about 1 inch and about 6 inches. As a specific, nonlimiting example, the greatest lateral dimension LD of the surface 140 may be between about 1.5 inch and about 4 inches (e.g., about 2 inches).

A first thickness $T_1$ of the plate 136 as measured in a direction perpendicular to the surface 140 may be, for example, between about 0.06 inch and about 0.5 inch. More specifically, the first thickness $T_1$ of the plate 136 may be, for example, between about 0.12 inch and about 0.25 inch. As a specific, nonlimiting example, the first thickness $T_1$ of the plate 136 as measured in a direction perpendicular to the surface 140 may be between about 0.125 inch and about 0.2 inch (e.g., about 0.19 inch). A second, maximum thickness $T_2$ of the abrasion-resistant material 138 as measured in the direction perpendicular to the surface 140 may be, for example, between about 0.05 inch and about 0.3 inch. More specifically, the second, maximum thickness $T_2$ of the abrasion-resistant material 138 may be, for example, between about 0.1 inch and about 0.25 inch. As a specific, nonlimiting example, the second, maximum thickness $T_2$ of the abrasion-resistant material 138 may be between about 0.15 inch and about 0.2 inch (e.g., about 0.15 inch).

Figure 3:
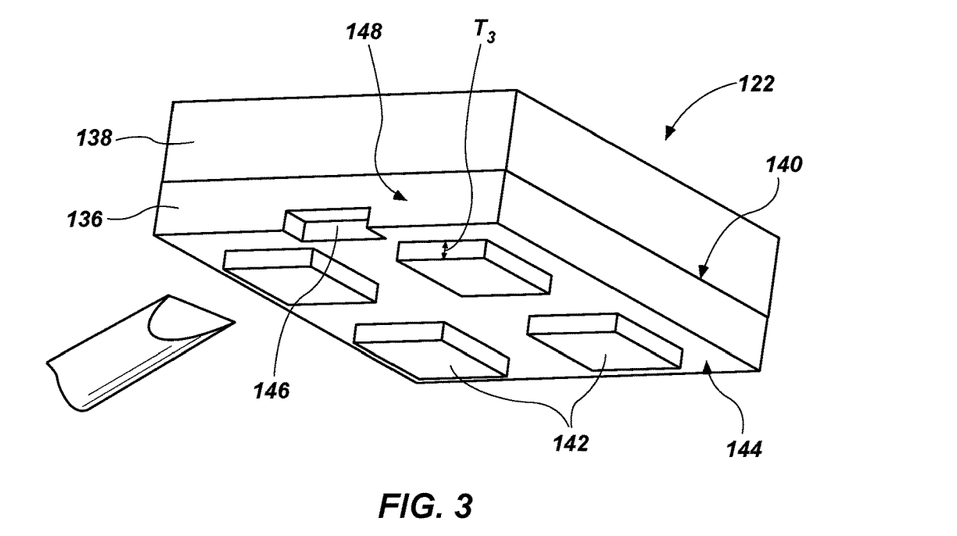
FIG. 3 is a perspective side view of the gage pad of FIG. 3.

FIG. 3 is a perspective side view of the gage pad 122 of FIG. 3. The gage pad 122 may include one or more spacers 142 extending from the plate 136 on a side of the plate 136 opposite the abrasion-resistant material 138. The spacers 142 may include, for example, posts, columns, discs, or other protrusions of the material of the plate 136 extending from another surface 144 of the plate 136 extending at least substantially parallel to the surface 140 to which the abrasion-resistant material 138 is attached and on a side of the plate 136 opposite the abrasion-resistant material 138. A third thickness $T_3$ of the spacers 142 as measured in a direction perpendicular to the other surface 144 may be, for example, between about 0.003 inch and about 0.005 inch. More specifically, the third thickness $T_3$ of the spacers 142 may be, for example, between about 0.0035 inch and about 0.0045 inch (e.g., 0.004 inch). The spacers 142 may be positioned to contact the body 102 (see FIG. 1) within the recess 124 (see FIG. 1), such that a gap is located between the body 102 (see FIG. 1) and the other surface 144, enabling braze material to flow into the gap to secure the gage pad 122 to the body 102 (see FIG. 1) within the recess 124 (see FIG. 1).

The plate 136 may include a notch 146 extending into the material of the plate 136 in a surface 148 extending between the surface 140 to which the abrasion-resistant material 138 is attached and the surface 144 from which the spacers 142 extend. The notch 146 may be configured as, for example an indentation, groove, or other recession extending from the surface 148 into the material of the plate 136. The notch 146 may be sized and shaped to receive at least a portion of a lever 148 within the notch 146 to enable the gage pad 122 to be more easily pried away from the body 102 (see FIG. 1) to detach the gage pad 122 from the body 102 (see FIG. 1). The lever 148 may include, for example, a pry bar, chisel, or other extended member configured to pry the gage pad 122 out of the recess 124 (see FIG. 1).

Figure 4:
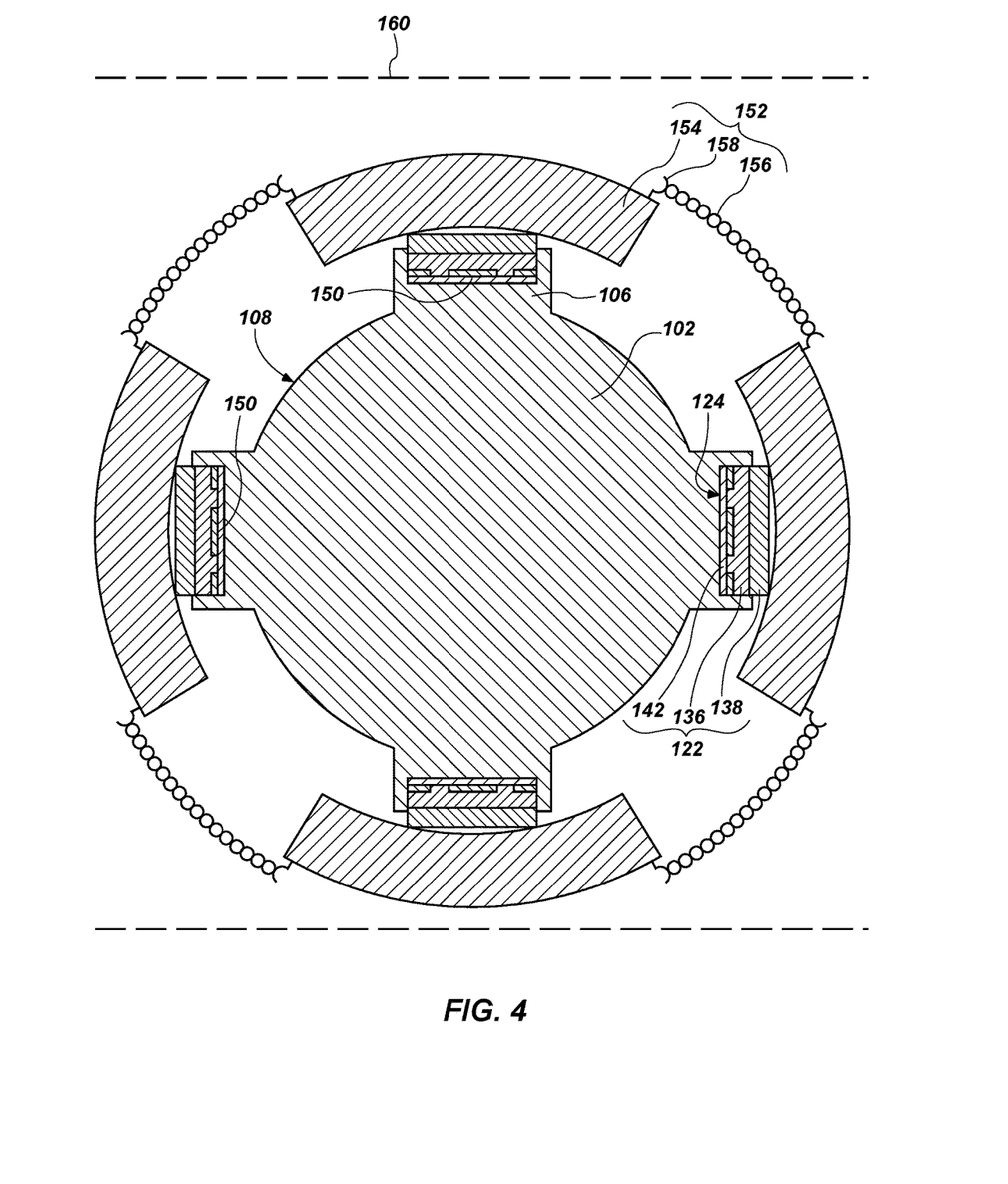
FIG. 4 is a cross-sectional top view of an intermediate stage in a process of making the earth-boring tool of FIG. 1.

FIG. 4 is a cross-sectional top view of an intermediate stage in a process of making the earth-boring tool 100 of FIG. 1. At this stage, the body 102, including the blades 106, junk slots 108, and recess or recesses 124 may have already been formed. In some embodiments, the cutting elements 104 (see FIG. 1) may have already been secured within the pockets 118 (see FIG. 1) utilizing the braze material 132 (see FIG. 1). In other embodiments, the pockets 118 (see FIG. 1) may lack cutting elements 104 (see FIG. 1) therein.

Another braze material 150 may be positioned in the recess or recesses 124 adjacent to the body 102. The braze material 150 may include, for example, a foil, disc, or other mass of metal or metal alloy material configured to braze the gage pads 122 to the body 102. In embodiments in which the cutting elements 104 (see FIG. 1) are already secured within the pockets 118 (see FIG. 1), the other braze material 150 may have a melting temperature less than a melting temperature of the braze material 132 (see FIG. 1) associated with the cutting elements 104 (see FIG. 1). In embodiments in which the cutting elements 104 (see FIG. 1) have not yet been secured within the pockets 118 (see FIG. 1), the other braze material 150 may have a melting temperature greater than the melting temperature of the braze material 132 (see FIG. 1) associated with the cutting elements 104 (see FIG. 1). Regardless, the melting temperature of the other braze material 150 will be less than the melting temperature of any metal or metal alloy material of the body 102 (e.g., the entirety of the body or the matrix of the particle-matrix composite material). The melting temperature of the other braze material 150 may be, for example, between about 500° F. and about 1,350° F. More specifically, the melting temperature of the other braze material 150 may be, for example, between about 750° F. and about 1,000° F. (e.g., about 800° F.). Each of the braze materials 132 and 150 may include, for example, a commercially available alloy. More specifically, each of the braze materials 132 and 150 may include a commercially available, silver-based alloy with the melting temperature selected as described previously in this disclosure.

The gage pads 122 may then be positioned within the recesses 124 with the braze material 150 interposed between the gage pads 122 and the body 102. The gage pads 122 may be temporarily secured in place by a retention member 152 extending around the circumference of the body 102 in whatever regions in which the gage pads 122 are located. The retention member 152 may be configured as, for example, a belt and may include, for example, rigid members 154 configured to abut against, and secure in place, the gage pads 122. For example, the rigid members 154 may be spaced and positioned for alignment with the respective blades 106. The rigid members 154 may include, for example, blocks, ring segments, or other masses of material that may withstand the temperatures of brazing while at least substantially maintaining their shape and positioning relative to the body 102 and gage pads 122. The retention member 152 may include flexible members 156 extending between adjacent rigid members 154. The flexible members 156 may enable the retention member 152 to wrap around the body 102 and adapt to bodies 102 of different shapes and sizes. The flexible members 156 may include, for example, chains, cables, hinges, or other flexible mechanisms or lengths of material that may withstand the temperatures of brazing while at least substantially maintaining their tension on the rigid members 154. The retention member 152 may include one or more latches 158 enabling one or more of the flexible members 156 to engage with, and disengage from, its associated rigid member or members 154. For example, the latches 158 may include hooks, clamps, or other mechanisms enabling the associated rigid member 154 to attach to, and detach from, its associated flexible member 156.

The assembly may be placed into a furnace and exposed to elevated temperatures meeting or exceeding the melting temperature of the other braze material 150. As a result, the other braze material 150 may liquefy and flow, and wet the surfaces of the body 102 within the recess 124 and the spacers 142 and at least surface 144 (see FIG. 3) of the plate 136. Tension from the retention member 152, combined with melting of the other braze material 150, may urge the gage pads 122 toward the body 102 and into their predetermined final positions at least partially within the recess 124. The other braze material 150 may at least substantially fill the gaps between the gage pad 122 and the body 102 within the recess 124. Upon cooling, the braze material 150 may solidify, securing the gage pads 122 to the body 102.

Because modular, tiled gage pads 122 may be patterned within recesses 124 of varying shapes and sizes and then secured to the body 102 in bulk, the gage pads 122 may be usable with earth-boring tools 100 (see FIG. 1) having greater variety in size and shape. The gage pads 122 may also reduce the need to store many components of differing, custom shapes and sizes or to generate custom-fit gage pads 122 for differing applications. Finally, attaching many gage pads 122 to respective bodies 102 at a time may reduce the need to dedicate resources to a given assembly project by completing many projects at the same time.

Figure 5:
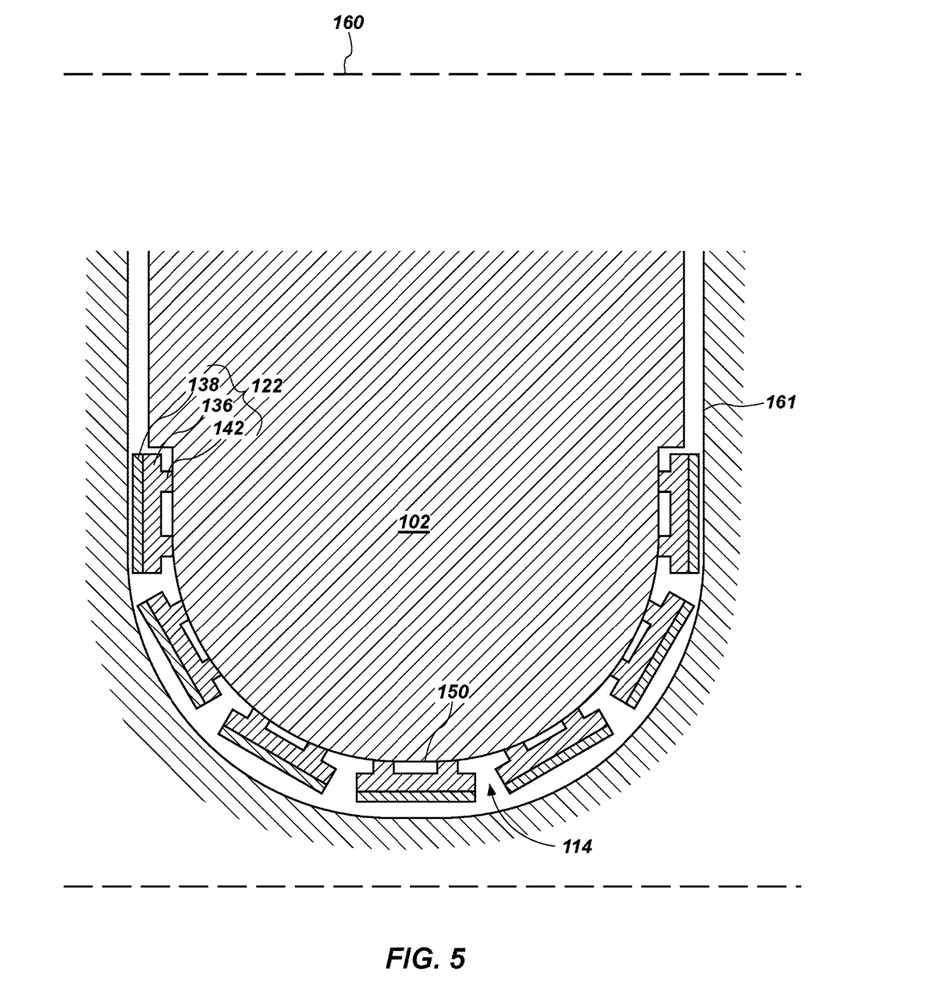
FIG. 5 is a cross-sectional side view of another intermediate stage in a process of making an earth-boring tool in accordance with this disclosure.

FIG. 5 is a cross-sectional side view of another intermediate stage in a process of making an earth-boring tool in accordance with this disclosure. In embodiments where the gage pads 122 are placed within multiple regions 112, 126, 128, and/or 130 (see FIG. 1) of the face 114, the body 102, other braze material 150, and gage pads 122 may be placed within a mold 161 shaped to hold the gage pads 122 against the body 102 during the process of securing the gage pads 122 to the body 102. The mold 161 and its contents may similarly be placed within a furnace and exposed to elevated temperatures to braze the gage pads 122 to the body 102. Although the term "gage pad" has been used to refer to the structures disclosed herein, other terms may equally be applied to such structure because it is not limited to use within the gage region 112 (see FIG. 1). Moreover, more broadly applicable terms, such as, for example, face pad, abrasion pad, and hardfacing pad, may be used equally to apply to the structures described herein. Accordingly, such structures may be used as a modular replacement for the custom production of regions of earth-boring tools where abrasion-resistant materials, such as, for example, hardfacing material or diamond-impregnated material, would be desirable.

Figure 6:
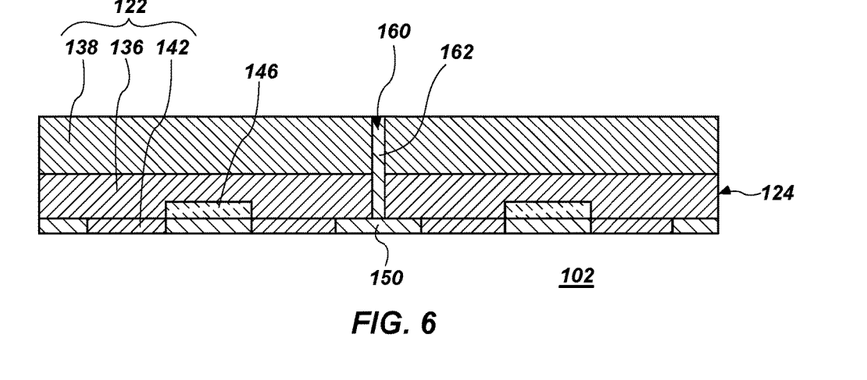
FIG. 6 is a side view of an assembly of gage pads in an intermediate stage of a process of making an earth-boring tool.

FIG. 6 is a side view of an assembly of gage pads 122 in an intermediate stage of a process of making an earth-boring tool 100 (see FIG. 1). As shown in FIG. 6, the other braze material 150 may surround the spacers 142 and extend between surfaces of the body 102 and at least the surface 144 of the plate 136 within the recess 124. When the gage pads 122 are placed adjacent to one another within the recess 124 in a tiled manner, they may be placed close to one another to reduce the size of any spaces 160 located between adjacent gage pads 122. For example, a greatest size of the space 160 between adjacent gage pads 122 may be less than about 0.25 inch. More specifically, the greatest size of the space 160 between adjacent gage pads 122 may be between about 0.01 inch and about 0.2 inch. As a specific, nonlimiting example, the greatest size of the space 160 between adjacent gage pads 122 may be between about 0.05 inch and about 0.1 inch. In some embodiments, additional hardfacing material 162 may be positioned between adjacent gage pads 122 to fill the spaces 160 therebetween.

When the gage pads 122 are first secured to the body 102, the second, maximum thickness $T_2$ of the abrasion-resistant material 138 may be greater than the expected final second, maximum thickness $T_2$ of the abrasion-resistant material 138. For example, the initial second, maximum thickness $T_2$ of the abrasion-resistant material 138 may be between about 0.25 inch and about 0.5 inch greater than the expected final second, maximum thickness $T_2$ of the abrasion-resistant material 138. More specifically, the initial second, maximum thickness $T_2$ of the abrasion-resistant material 138 may be, for example, between about 0.3 inch and about 0.4 inch (e.g., about 0.38 inch) greater than the expected final second, maximum thickness $T_2$ of the abrasion-resistant material 138. As a result, the diameter D (see FIG. 1) of the earth-boring tool 100 (see FIG. 1) may be greater than the desired final diameter D (see FIG. 1).

Figure 7:
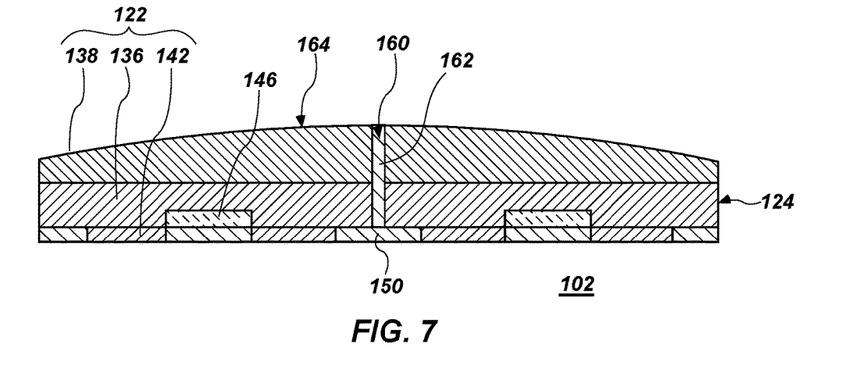
FIG. 7 is a side view of the assembly of gage pads in a subsequent stage of the process of making the earth-boring tool.

FIG. 7 is a side view of the assembly of gage pads 122 in a subsequent stage of the process of making the earth-boring tool 100 (see FIG. 1). After securing the gage pads 122 within the recess 124, an exposed surface 164 of the abrasion-resistant material 138 may be rendered to its final shape by removing at least a portion of the abrasion-resistant material 138. For example, the exposed surface 164 of the abrasion-resistant material 138 may be ground into an arcuate shape to collectively render the exposed surface 164 of the abrasion-resistant material 138 an at least substantially circular shape and to render the diameter D (see FIG. 1) of the earth-boring tool 100 to a desired final diameter D (see FIG. 1).

During use in the downhole environment, and referring collectively to FIGS. 1, 3, and 7, surfaces of the earth-boring tool 100 are subjected to high pressures and temperatures in the presence of abrasive, erosive, and often corrosive materials. As a result, those surfaces, and the exposed surfaces 164 of the gage pads 122 in particular, will inevitably experience wear. As a result, the diameter D of the earth-boring tool 100 may gradually shrink or become irregular, eventually reaching the point where the earth-boring tool 100 no longer forms the borehole to the desired or required diameter. Although those exposed surfaces may experience wear, the inventor has found that the remainder of the body 102 would remain suitable for reuse if it could be restored to its original dimensions.

Gage pads 122 in accordance with this disclosure, once they have worn down, may be removed from the body 102. For example, the lever 148 may be inserted into the notch 146 of a respective gage pad 122, optionally during or after the application of heat to weaken or flow the other braze material 150, and the gage pads 122 may be detached from the body 102. Replacement gage pads 122 or the same gage pads 122 with replenished quantities of the abrasion-resistant material 138 may then be placed within the recess 124, secured to the body 102, and ground to a renewed diameter D. Accordingly, gage pads 122 in accordance with this disclosure may reduce waste of materials, time, and energy by facilitating reuse of a greater proportion of worn-down earth-boring tools 100 and components thereof.

Additional, nonlimiting embodiments within the scope of this disclosure include the following:

Embodiment 1

An earth-boring tool, comprising: a body having blades protruding therefrom; at least one hardfacing pad secured to at least one blade, the at least one hardfacing pad located at least partially within a recess extending at least into the at least one blade around a circumference of a gage region of the body, the at least one hardfacing pad comprising a plate, an abrasion-resistant material secured to the plate on a side of the plate opposite the body, and at least one spacer extending from the plate toward the body, such that the plate is spaced from the body by at least a thickness of the at least one spacer; and a braze material securing the at least one hardfacing pad to the body, the braze material extending around the at least one spacer and located between the plate and the body.

Embodiment 2

The earth-boring tool of Embodiment 1, wherein the at least one hardfacing pad comprises a notch located in the plate, the notch configured to receive a lever for removal of the at least one hardfacing pad from the body.

Embodiment 3

The earth-boring tool of Embodiment 1 or Embodiment 2, wherein the thickness of the at least one spacer is between about 0.003 inch and about 0.005 inch.

Embodiment 4

The earth-boring tool of any one of Embodiments 1 through 3, wherein a greatest lateral dimension of a surface of the plate facing the abrasion-resistant material is between about 0.5 inch and about 8 inches.

Embodiment 5

The earth-boring tool of any one of Embodiments 1 through 4, wherein the body comprises a particle-matrix composite material comprising particles of a ceramic material in a matrix of a metal or metal alloy material.

Embodiment 6

The earth-boring tool of Embodiment 5, wherein a melting temperature of the metal or metal alloy material is greater than a melting temperature of the braze material.

Embodiment 7

The earth-boring tool of Embodiment 6, further comprising at least one cutting element secured partially within a pocket extending into the body by another braze material, wherein a melting temperature of the other braze material is less than the melting temperature of the braze material.

Embodiment 8

The earth-boring tool of any one of Embodiments 1 through 7, wherein a surface of the abrasion-resistant material facing away from the plate exhibits an arcuate shape.

Embodiment 9

The earth-boring tool of any one of Embodiments 1 through 8, wherein the abrasion-resistant material of the at least one hardfacing pad comprises a hardfacing material.

Embodiment 10

The earth-boring tool of any one of Embodiments 1 through 9, where the plate of the at least one hardfacing pad comprises a metal or metal alloy material.

Embodiment 11

A method of making an earth-boring tool, comprising: placing a braze material within a recess extending at least into a blade protruding from a body of the earth-boring tool around a circumference of a gage region of the body; placing at least one hardfacing pad at least partially within the recess, the at least one hardfacing pad comprising a plate, an abrasion-resistant material secured to the plate on a side of the plate opposite the body, and at least one spacer extending from the plate toward the body, such that a gap is located between the plate and the body; temporarily securing the at least one hardfacing pad in place by placing a retention member around the hardfacing pads; exposing the body, the braze material, and the at least one hardfacing pad to an elevated temperature, at least partially flowing the braze material; and solidifying the braze material in response to cooling the braze material from the elevated temperature, the braze material securing the at least one hardfacing pad to the body of the earth-boring tool.

Embodiment 12

The method of Embodiment 11, wherein the body comprises a particle-matrix composite material comprising particles of a ceramic material in a matrix of a metal or metal alloy material and wherein the exposing the body, the braze material, and the at least one hardfacing pad to the elevated temperature, at least partially flowing the braze material, comprises exposing the body, the braze material, and the at least one hardfacing pad to the elevated temperature less than a melting temperature of the metal or metal alloy material, at least partially flowing the braze material.

Embodiment 13

The method of Embodiment 11 or Embodiment 12, wherein placing the at least one hardfacing pad at least partially within the recess comprises placing a surface of the plate of the at least one hardfacing pad located opposite the abrasion-resistant material between about 0.003 inch and about 0.005 inch from the body.

Embodiment 14

The method of any one of Embodiments 11 through 13, wherein temporarily securing the at least one hardfacing pad in place by placing a retention member around the at least one hardfacing pad comprises aligning at least one rigid member of the retention member with the at least one hardfacing pad, aligning at least one flexible member of the retention member with a junk slot, and temporarily securing the flexible securing members to the rigid members utilizing a latch.

Embodiment 15

The method of any one of Embodiments 11 through 14, further comprising grinding a surface of the abrasion-resistant material facing away from the plate to an arcuate shape.

Embodiment 16

The method of Embodiment 15, wherein grinding the surface of the abrasion-resistant material comprises removing between about 0.25 inch and 0.5 inch of the abrasion-resistant material as measured from the surface before grinding.

Embodiment 17

A method of repairing an earth-boring tool, comprising: removing at least one hardfacing pad from within a recess extending at least into a blade protruding from a body of the earth-boring tool around a circumference of a gage region of the body; replacing the at least one hardfacing pad with at least another hardfacing pad located at least partially within the recess, the at least another hardfacing pad comprising a plate, an abrasion-resistant material secured to the plate on a side of the plate opposite the body, and at least one spacer extending from the plate toward the body, such that a gap is located between the plate and the body; temporarily securing the at least another hardfacing pad in place by placing a retention member in contact with the at least another hardfacing pad around the gage region; exposing the body, a braze material located proximate the at least another hardfacing pad, and the at least another hardfacing pad to an elevated temperature, at least partially flowing the braze material; and solidifying the braze material in response to cooling the braze material from the elevated temperature, the braze material securing the at least another hardfacing pad to the body of the earth-boring tool.

Embodiment 18

The method of Embodiment 17, wherein removing the at least one hardfacing pad comprises inserting at least a portion of a lever into a notch located in a plate of the at least one hardfacing pad and prying the at least one hardfacing pad away from the body.

Embodiment 19

The method of Embodiment 17 or Embodiment 18, further comprising grinding a surface of the abrasion-resistant material facing away from the plate to an arcuate shape.

Embodiment 20

The method of Embodiment 19, wherein grinding the surface of the abrasion-resistant material comprises rendering a diameter of the gage region after grinding different from a diameter of the gage region before removal of the at least one hardfacing pad.

While certain illustrative embodiments have been described in connection with the figures, those of ordinary skill in the art will recognize and appreciate that the scope of this disclosure is not limited to those embodiments explicitly shown and described in this disclosure. Rather, many additions, deletions, and modifications to the embodiments described in this disclosure may be made to produce embodiments within the scope of this disclosure, such as those specifically claimed, including legal equivalents. In addition, features from one disclosed embodiment may be combined with features of another disclosed embodiment while still being within the scope of this disclosure, as contemplated by the inventor.

What is claimed is:

1. An earth-boring tool, comprising:
   a body having blades protruding therefrom;
   at least one hardfacing pad secured to at least one blade, the at least one hardfacing pad located at least partially within a recess extending into at least the at least one blade around a circumference of a gage region of the body, the at least one hardfacing pad comprising a plate, an abrasion-resistant material secured to the plate on a side of the plate opposite the body, and at least one spacer extending from the plate toward the body, such that the plate is spaced from the body by at least a thickness of the at least one spacer; and
   a braze material securing the at least one hardfacing pad to the body, the braze material extending around the at least one spacer and located between the plate and the body.

2. The earth-boring tool of claim 1, wherein the at least one hardfacing pad comprises a notch located in the plate, the notch configured to receive a lever for removal of the at least one hardfacing pad from the body.

3. The earth-boring tool of claim 1, wherein the thickness of the at least one spacer is between about 0.003 inch and about 0.005 inch.

4. The earth-boring tool of claim 1, wherein a greatest lateral dimension of a surface of the plate facing the abrasion-resistant material is between about 0.5 inch and about 8 inches.

5. The earth-boring tool of claim 1, wherein the body comprises a particle-matrix composite material comprising particles of a ceramic material in a matrix of a metal or metal alloy material.

6. The earth-boring tool of claim 5, wherein a melting temperature of the metal or metal alloy material is greater than a melting temperature of the braze material.

7. The earth-boring tool of claim 6, further comprising at least one cutting element secured partially within a pocket extending into at least one of a blade and the body by another braze material, wherein a melting temperature of the other braze material is less than the melting temperature of the braze material.

8. The earth-boring tool of claim 1, wherein a surface of the abrasion-resistant material facing away from the plate exhibits an arcuate shape.

9. The earth-boring tool of claim 1, wherein the abrasion-resistant material of the at least one hardfacing pad comprises a hardfacing material.

10. The earth-boring tool of claim 1, wherein the plate of the at least one hardfacing pad comprises a metal or metal alloy material.

11. A method of making an earth-boring tool, comprising:
    placing a braze material within a recess extending at least into a blade protruding from a body of the earth-boring tool around a circumference of a gage region of the body;
    placing at least one hardfacing pad at least partially within the recess, the at least one hardfacing pad comprising a plate, an abrasion-resistant material secured to the plate on a side of the plate opposite the body, and at least one spacer extending from the plate toward the body, such that a gap is located between the plate and the body;
    temporarily securing the at least one hardfacing pad in place by placing a retention member around the hardfacing pads;
    exposing the body, the braze material, and the at least one hardfacing pad to an elevated temperature, at least partially flowing the braze material; and
    solidifying the braze material in response to cooling the braze material from the elevated temperature, the braze material securing the at least one hardfacing pad to the body of the earth-boring tool.

12. The method of claim 11, wherein the body comprises a particle-matrix composite material comprising particles of a ceramic material in a matrix of a metal or metal alloy material and wherein the exposing the body, the braze material, and the at least one hardfacing pad to the elevated temperature, at least partially flowing the braze material, comprises exposing the body, the braze material, and the at least one hardfacing pad to the elevated temperature less than a melting temperature of the metal or metal alloy material, at least partially flowing the braze material.

13. The method of claim 11, wherein placing the at least one hardfacing pad at least partially within the recess comprises placing a surface of the plate of the at least one hardfacing pad located opposite the abrasion-resistant material between about 0.003 inch and about 0.005 inch from the body.

14. The method of claim 11, wherein temporarily securing the at least one hardfacing pad in place by placing a retention member around the at least one hardfacing pad comprises aligning at least one rigid member of the retention member with the at least one hardfacing pad, aligning at least one flexible member of the retention member with a junk slot, and temporarily securing the flexible securing members to the rigid members utilizing a latch.

15. The method of claim 11, further comprising grinding a surface of the abrasion-resistant material facing away from the plate to an arcuate shape.

16. The method of claim 15, wherein grinding the surface of the abrasion-resistant material comprises removing between about 0.25 inch and 0.5 inch of the abrasion-resistant material as measured from the surface before grinding.

17. A method of repairing an earth-boring tool, comprising:
  removing at least one hardfacing pad from within a recess extending into a blade protruding from a body of the earth-boring tool around a circumference of a gage region of the body;
  replacing the at least one hardfacing pad with at least another hardfacing pad located at least partially within the recess, the at least another hardfacing pad comprising a plate, an abrasion-resistant material secured to the plate on a side of the plate opposite the body, and at least one spacer extending from the plate toward the body, such that a gap is located between the plate and the body;
  temporarily securing the at least another hardfacing pad in place by placing a retention member in contact with the at least another hardfacing pad around the gage region;
  exposing the body, a braze material located proximate the at least another hardfacing pad, and the at least another hardfacing pad to an elevated temperature, at least partially flowing the braze material; and
  solidifying the braze material in response to cooling the braze material from the elevated temperature, the braze material securing the at least another hardfacing pad to the body of the earth-boring tool.

18. The method of claim 17, wherein removing the at least one hardfacing pad comprises inserting at least a portion of a lever into a notch located in a plate of the at least one hardfacing pad and prying the at least one hardfacing pad away from the body.

19. The method of claim 17, further comprising grinding a surface of the abrasion-resistant material facing away from the plate to an arcuate shape.

20. The method of claim 19, wherein grinding the surface of the abrasion-resistant material comprises rendering a diameter of the gage region after grinding different from a diameter of the gage region before removal of the at least one hardfacing pad.

* * * * *